(12) United States Patent
Mahida et al.

(10) Patent No.: US 9,052,737 B2
(45) Date of Patent: Jun. 9, 2015

(54) ROTARY CONTROL

(71) Applicant: Motorola Solutions, Inc., Schaumburg, IL (US)

(72) Inventors: Dharmendrasinh R. Mahida, Sunrise, FL (US); Peter B. Gilmore, Plantation, FL (US); Anthony M. Kakiel, Coral Springs, FL (US); Charles E. Kline, Plantation, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 13/776,180

(22) Filed: Feb. 25, 2013

(65) Prior Publication Data

US 2014/0238183 A1 Aug. 28, 2014

(51) Int. Cl.
| | |
|---|---|
| *F16H 35/18* | (2006.01) |
| *G05G 1/10* | (2006.01) |
| *H01H 19/14* | (2006.01) |
| *F16D 55/38* | (2006.01) |
| *H01H 3/10* | (2006.01) |
| *H01H 19/11* | (2006.01) |

(52) U.S. Cl.
CPC *G05G 1/10* (2013.01); *F16D 55/38* (2013.01); *Y10T 74/2084* (2015.01); *H01H 3/10* (2013.01); *H01H 19/11* (2013.01); *H01H 2300/024* (2013.01)

(58) Field of Classification Search
CPC .............. G05G 1/10; G05G 5/04; H03J 1/06; H01H 3/08
USPC ...... 74/10 A, 10 R, 10.22, 10.29, 10.33, 10.7, 74/504, 553; 334/88; 292/336.3, 347; 200/11 R, 316, 336, 564; 188/71.5, 188/72.1, 167; 192/56.6, 107 M; 464/46
See application file for complete search history.

(56) References Cited

U.S. PATENT DOCUMENTS

| | | | |
|---|---|---|---|
| 2,660,904 A | * | 12/1953 | Hilsinger, Jr. .................... 74/504 |
| 3,254,861 A | * | 6/1966 | Jahn .............................. 242/318 |
| 3,892,383 A | | 7/1975 | Hesse |
| 4,036,079 A | | 7/1977 | Pratt |

(Continued)

FOREIGN PATENT DOCUMENTS

| | | |
|---|---|---|
| DE | 4024611 A1 | 2/1991 |
| GB | 1469848 A | 4/1977 |

(Continued)

OTHER PUBLICATIONS

PCT International Search Report Dated May 20, 2014 for Counterpart Application PCT/US2014/016672.

*Primary Examiner* — Thomas R. Hannon
*Assistant Examiner* — Adam D Rogers
(74) *Attorney, Agent, or Firm* — Barbara R. Doutre; Daniel R. Bestor (57) ABSTRACT

A rotary control (100, 500, 700) provides improved running-torque through a running-torque stack up assembly (140). The running-torque stack up assembly (140) may be implemented in a modular approach (500, 700) independent of a shaft (130) and switch housing, or may be implemented to incorporate the shaft (100) and switch housing. The running-torque stack up assembly (140) is formed of a spring (114), a stationary disk (112), and a rotating disk (108) having sliding top and bottom surfaces provided through either pads (106, 110) or an overmolded coating (710).

20 Claims, 5 Drawing Sheets

(56) References Cited

U.S. PATENT DOCUMENTS

| | | | |
|---|---|---|---|
| 4,077,503 A | 3/1978 | Lieberman et al. | |
| 4,487,089 A | 12/1984 | Harwood | |
| 4,728,054 A * | 3/1988 | Pisapio | 242/258 |
| 4,881,631 A * | 11/1989 | Ward, II | 194/228 |
| 4,890,708 A | 1/1990 | Kitano et al. | |
| 4,895,236 A | 1/1990 | Sakakibara | |
| 4,993,280 A | 2/1991 | Olkoski et al. | |
| 5,134,757 A | 8/1992 | Johnson | |
| 5,180,042 A * | 1/1993 | Ogiso | 192/56.1 |
| 7,592,562 B1 | 9/2009 | Vanderwege | |
| 8,220,361 B2 * | 7/2012 | Slavin et al. | 74/553 |
| 8,415,577 B2 * | 4/2013 | Garcia et al. | 200/564 |
| 2009/0065620 A1 | 3/2009 | Halterman, Jr. et al. | |
| 2012/0298494 A1 * | 11/2012 | Mahida et al. | 200/336 |

FOREIGN PATENT DOCUMENTS

| | | |
|---|---|---|
| JP | 2026320 A | 1/1990 |
| JP | 8211957 A | 8/1996 |
| JP | 2009135356 A | 6/2009 |

\* cited by examiner

FIG. 9

ROTARY CONTROL

FIELD OF THE INVENTION

The present invention relates generally to a rotary control and more particularly to a rotary control for a communication device.

BACKGROUND

Rotary controls are used in a variety of communication devices to provide a user interface for controlling operational functions such as power on/off, volume, and channel change, to name a few. For certain rotary control applications, the control may be designed to provide tactile feedback in the form of "running-torque," also referred to as frictional resistance, as the control is rotated.

The tactile feedback provided by a rotary control is particularly important for portable communication devices operating within a public safety environment. For example, in public safety environments involving fire rescue, paramedic and/or law enforcement, a handheld radio may be operated by a user wearing heavy gloves, working in an area with little or no illumination, and/or other environmental or physical conditions that necessitate a simple, easy to interpret user interface. Avoiding inadvertent actuation of the rotary control is also very important. As such, in the public safety environment, a communication device that offers a running-torque feedback is highly desirable. However, several design challenges are associated with the implementation of a running-torque rotary control. Life cycle sustainability is a concern. Past designs incorporating external torque adders have faced issues with tolerance sensitivity and over compression causing excessive wear. Stack up height, ease of manufacturability and knob retention are also factors taken into consideration in the design of a rotary control.

Accordingly, there is a need for an improved rotary control.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components related to a rotary control. The rotary control formed in accordance with the embodiments to be described herein provides improved tactile feedback through improved running-torque. For the purposes of this application, the term running-torque is defined as continuous resistance to rotation applied throughout full rotation of the rotary control. Improved running-torque beneficially minimizes inadvertent control actuation. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the elements.

Figure 1:
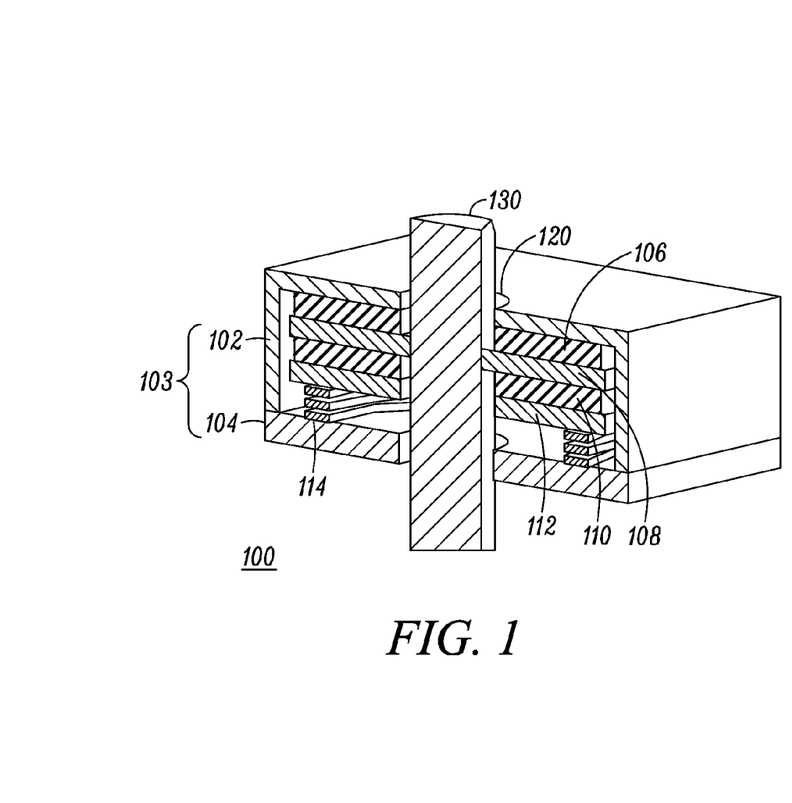
FIG. 1 is a cut-away view illustrating a rotary control in accordance with various embodiments.
Figure 2:
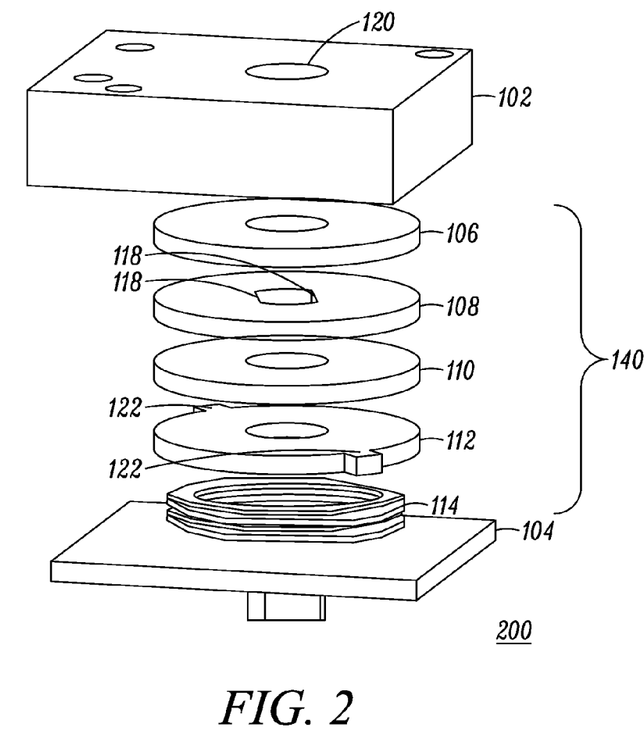
FIG. 2 is an exploded view illustrating the rotary control of FIG. 1 in accordance with various embodiments.

FIG. 1 is a cut-away view of a rotary control 100 in accordance with various embodiments. FIG. 2 is a partially exploded view of the rotary control 100 of FIG. 1 in accordance with various embodiments. Referring to FIGS. 1 and 2, the rotary control 100 comprises a casing 103 formed of first and second casing portions 102, 104, the casing having a through-hole 120 for receiving a shaft 130. In accordance with the various embodiments, the casing 103 comprises a running-torque stack up assembly 140 which provides a resistance in response to rotation of the shaft 130. In accordance with the various embodiments, the running-torque stack up assembly 140 comprises a first rubber pad 106 stacked against the top surface of a rotating disk 108, the first rubber pad 106 thereby providing a first sliding surface. The rotating disk 108 comprises a shaped hole, such as a Double-D shaped hole 118, to couple the rotating disk 108 to the shaft 130. A second rubber pad 110 is stacked against the bottom surface of the rotating disk 108 to form a second sliding surface. The second rubber pad 110 is stacked against a stationary disk 112. Each pad 106, 108 has an opening aligning with the hole 118 through which the shaft 130 extends and about which the pads rotationally slide. The stationary disk 112 is rotationally constrained within the casing 103, such as by tabs 122 or other constraining elements. A spring 114 is stacked against the stationary disk 112. In accordance with the various embodiments, the rotating disk 108 rotates in response to rotation of the shaft 130 while the rubber pads 106, 110 slide freely thereby providing tangential forces, while the spring and stationary disk 112 provide normal forces. Thus, a very controlled running-torque is provided by control 100.

In accordance with the various embodiments, the rubbers pads 106, 110 provide a slideable surface element to each surface of the rotating disk 108 which allows the rotating disk 108, which may be formed of a metallic material, to move rotationally in response to the shaft. Other slideable surface element embodiments will be described in conjunction with other figures.

The spring 114, which is preferably formed of metal, applies a normal force on stationary disk 112, which is also preferably formed of metal. The normal force is transferred from the stationary disk through the rest of the stack up 140. Pad 110 and stationary disk 112 form a first sliding contact pair 108/110, and rotating disk 108 with pad 106 form a second sliding contact pair 106/108. Pad 106 and casing portion 102 form a third sliding contact pair 102/106. A combination of normal forces transferred at first sliding contact pair 108/110 and friction coefficient between second sliding contact pair 106/108 results in resistance against the rotation, which applies running-torque at shaft 130. The spring 114 provides a force generating and wear compensating member to the running-torque stack up assembly 140.

Alternative embodiments other than the Double-D shaped hole 118 may also be suitable for retaining the rotating disk 108 to the shaft 130. For example, the shaft 130 could be formed with Double-D shaped sides and the rotating disk 108 could have a reverse Double-D shaped hole to align with the shaft. As another alternative, the shaft 130 could be formed with matching ear elements that could be used to retain the rotating disk 108.

The order of assembly for the embodiment of FIG. 2 begins with the first pad 106 being inserted into a recess of the first casing portion 102, followed by the rotating disk 108 followed by the second rubber pad 110. The stationary disk 112 is then be inserted, for example via tabs 122 into corresponding slots formed within interior sidewalls of the casing 103. The spring 114 is then stacked upon the stationary disk 112 and the second casing portion 104 closes and completes the assembly. The shaft 130 is inserted and aligns with corresponding alignment and retaining features, such as the Double-D shaped sides on rotating disk 108. The order of assembly may also be accomplished in a reverse order depending on the orientation of the casing and assembly. Thus, the shaft 130 may be inserted at either the start of the assembly or at the end of the assembly.

The rotary control 100 providing running-torque can be used in a variety of rotary control applications. For example, the rotary control 100 can be used in push on/push off control applications with continuous rotation or can used in a single click application with non-continuous rotation having a stop.

Figure 3:
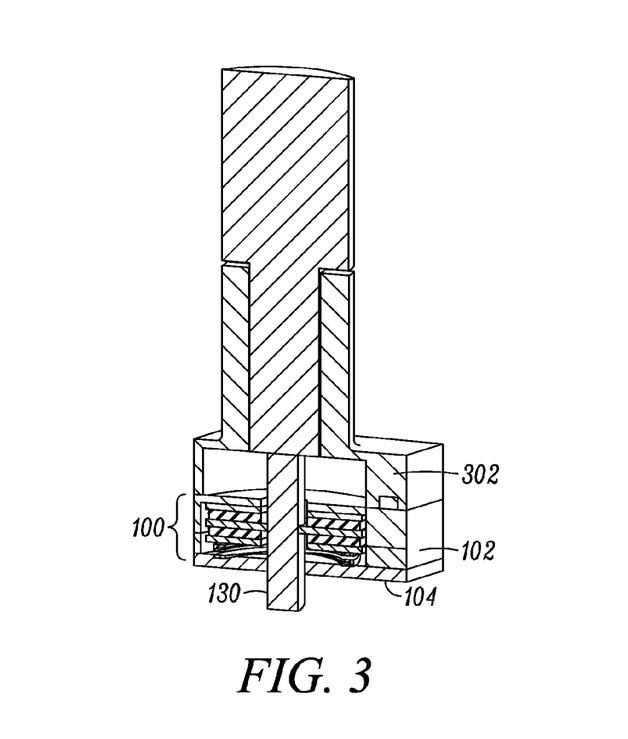
FIG. 3 is a cut-away view illustrating the rotary control of FIG. 1 in accordance various embodiments.

FIG. 3 shows the rotary control 100 of FIGS. 1 and 2 coupled to a switch housing 302 in accordance with various embodiments. The shaft 130 is shown inserted through the switch housing 302 and casing so as to form a rotary control module that can be coupled to a communication device.

Figure 4:
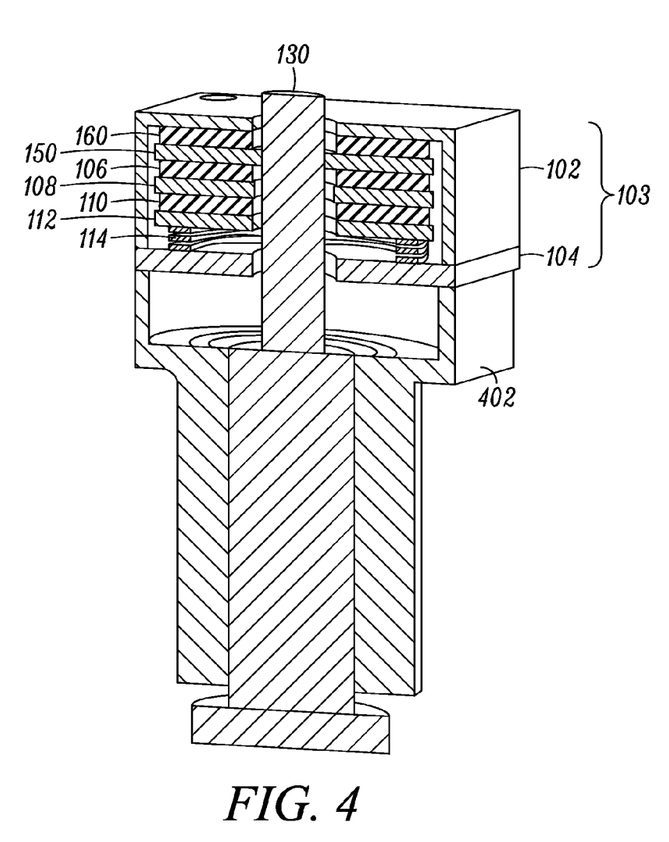
FIG. 4 is a cut-away view of the rotary control of FIG. 1 in accordance with various embodiments.

FIG. 4 shows the rotary control 100 of FIGS. 1 and 2 coupled to a switch housing 402 in accordance with various embodiments. In this embodiment the running-torque stack up is formed with an additional rotating disk 150 and additional pad 160. Additional pairs of rotating disk/pad combinations can be stacked within the assembly 140 to increase the resistance of the running-torque. Thus, the rotary control 100 provides the flexibility of a design which can be well adapted to accommodate various running-torque needs.

In the embodiment of FIG. 4, the casing 103 is coupled to switch housing 402 such that the shaft 130 is inserted in the opposite direction from that of FIG. 3. In other words, the running-torque stack up assembly 140 can be used in either orientation relative to the shaft entry. Thus, the rotary control design 100 is also highly adaptable to various switch housing orientations.

In operation, the running-torque assembly 140 operates by turning the shaft 130 which turns rotating disk 108 while the pads 106, 110 slide freely, in conjunction with the stationary disk 112 and spring 114 providing compressive normal forces to the combination of pad 110/rotating disk 108/pad 106. Normal force is the force acting perpendicular to contact pair plane, tangential force is the force acting parallel to contact pair plane.

The running-torque stack up assembly 140 minimizes tolerance sensitivity and over compression thereby minimizing excessive wear. Samples of devices having stack up height of 4 to 5 mm within a casing of approximately 8×10 mm size have shown to have good life cycle sustainability and knob retention.

The rotary control provided by the embodiments of FIGS. 1-4 has included the shaft 130 as part of the module. Alternatively, in accordance with various embodiments, the running-torque stack up assembly can be formed as a modular drop-in component for coupling to devices already having a shaft. The drop-in configuration allows the rotary control module to be an independent module from the switch housing and shaft. The rotary control module to be described in conjunction with FIGS. 5-8 similarly comprises running-torque stack up comprising a rotating disk having sliding surfaces formed thereon, a stationary disk coupled to the casing, and a spring seated between the casing and the stationary disk.

Figure 5:
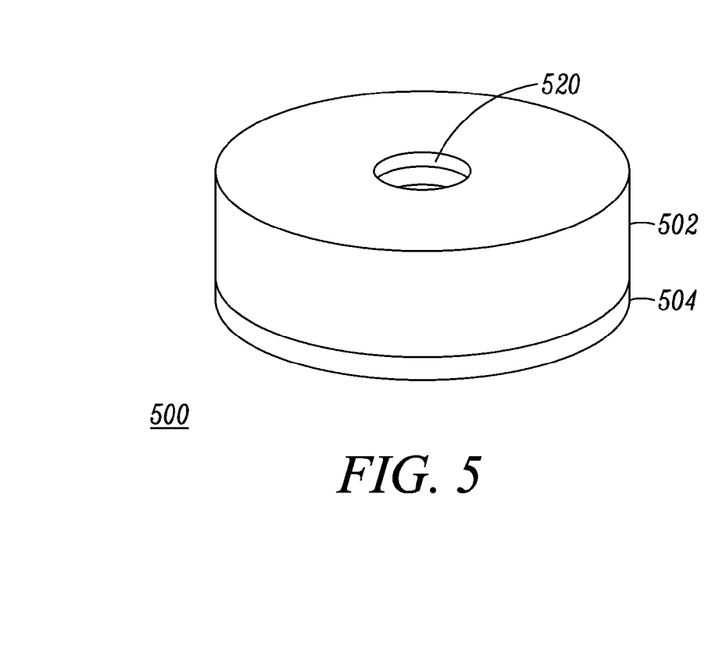
FIG. 5 is a rotary control module in accordance with various embodiments.
Figure 6:
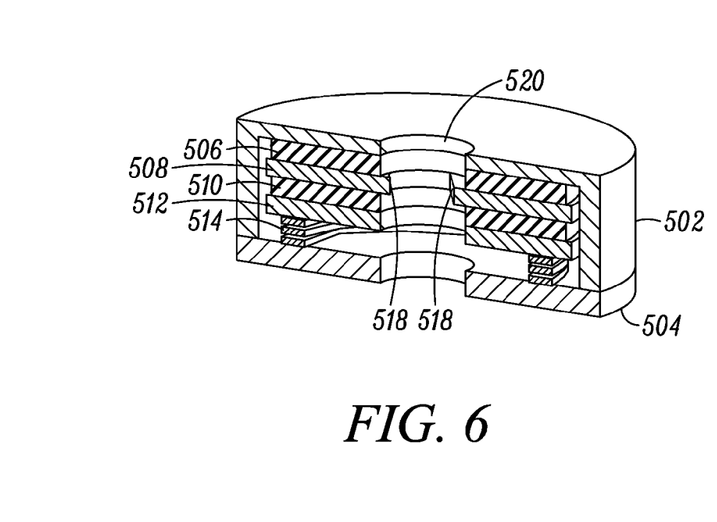
FIG. 6 is a cut-away view of the rotary control module of FIG. 5 in accordance with various embodiments.

FIGS. 5 and 6 show a rotary control module 500 and cross-sectional view thereof in accordance with various embodiments. Rotary control module 500 provides a module with drop-in capability for a communication device, such as a portable radio, wherein the radio has a shaft. Rotary control module 500 comprises a casing formed of first and second casing portions 502, 504, the casing having a through-hole 520 for receiving a shaft. Rotary control module 500 comprises a stack up running-torque assembly within the casing comprising a rubber pad 506 stacked upon rotating disk 508 which is stacked upon another rubber pad 510 which is stacked upon stationary disk 512 which is stacked upon spring 514 to provide running-torque for a shaft. Rotating disk 508 includes a shaped alignment feature 518 at its opening, such as a shaped hole, for coupling to a shaft.

The running-torque stack up assembly provides the advantages of generating normal force as well as compensating for loss of wear on a rubber part. The modularity of the running-torque stack up assembly is highly advantageous to drop-in applications.

Figure 7:
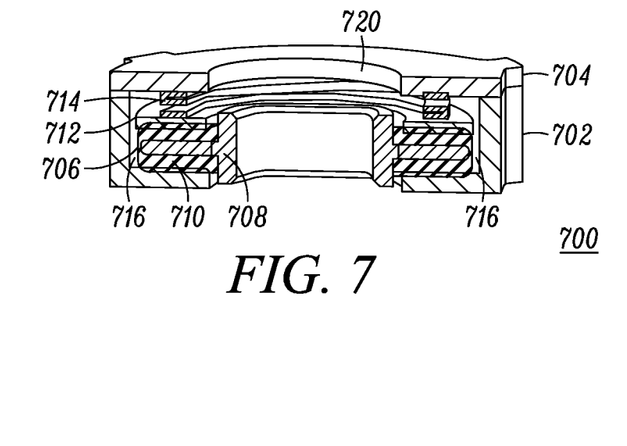
FIG. 7 is cut-away view of a rotary control module in accordance with various embodiments.
Figure 8:
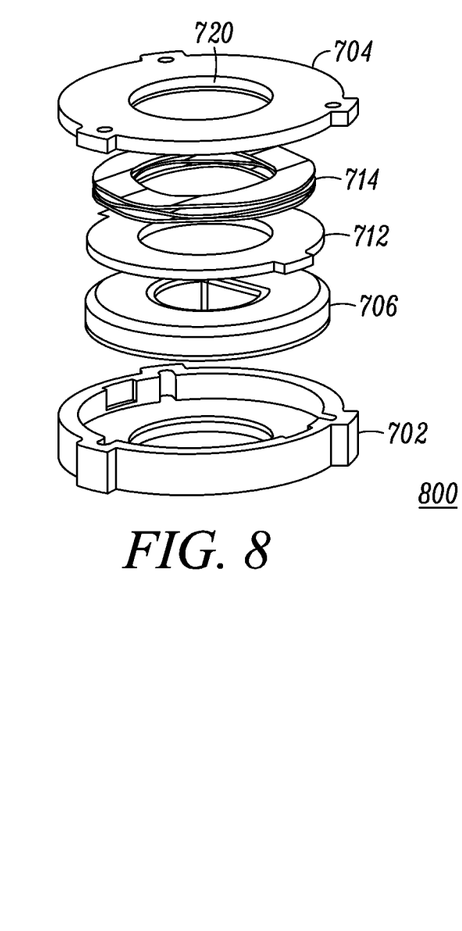
FIG. 8 is an exploded view of a rotary control module of FIG. 7 in accordance with various embodiments.

FIG. 7 is a rotary control module 700 formed in accordance with various embodiments, and FIG. 8 shows an exploded view thereof. Rotary control module 700 provides a module with drop-in capability for a communication device, such as a radio, wherein the radio has a shaft. Referring to FIGS. 7 and 8, rotary control module 700 comprises a casing formed of first and second casing portions 702, 704, the casing having a through-hole 720 for receiving a shaft of a radio. The casing includes a recess formed therein and within which are stacked a spring 714, a stationary disk 712, and an overmolded rotating disk 706.

The stationary disk 712 is preferably coupled to the casing via tabs/slots in the manner previously described so as to constrain rotational movement of the stationary disk. The spring 714 provides normal compression tolerance to the stationary disk 712 and the remaining assembly.

In the embodiment of FIGS. 7 and 8, the two rubber pads previously described from FIGS. 1-4 (106, 110) have been combined as an overmolded coating 710, such as silicone or rubber, providing an overmolded coating 710 to the rotating disk 708 to form a single piece part, shown as overmolded rotating disk 706. The overmolded rotating disk 706 has an interior shaped hole (seen in FIG. 8) for aligning with a shaft. A gap 716 is provided between the overmolded coating 710 and the casing to allow radial float between a shaft and casing. The drop-in configuration advantageously minimizes the number of piece parts for the running-torque stack up assembly.

As in the previous embodiments, the casing 702, 704 is preferably formed of a metal material, and the stationary disk may be formed of a metallic material. The embodiments of FIGS. 5-8 provide a rotary control module that is an independent module from a switch housing and shaft, thereby providing the advantages of fewer piece parts and drop-in module capability for devices already having a shaft.

In accordance with the various embodiments, the overmolded rotating disk 706 of FIG. 7, or the use of rubber pads 106, 110 with rotating disk 108 of FIGS. 1-3, or the use of additional pad/disk pairs 160/150 of FIG. 3 all provide sliding surfaces for the running-torque stack up assembly. All of these running-torque stack up assemblies provide improved frictional resistance for tactile feedback.

Past devices have encountered loss of running torque even with a low number of rotations. The rotary control of the various embodiments minimizes loss of running-torque through the use of its novel stack up assembly. Additionally, the rotary control module eliminates running-torque sensitivity to assembly level tolerances. All the forces are self contained in the module which in turn results in improved knob retention.

Figure 9:
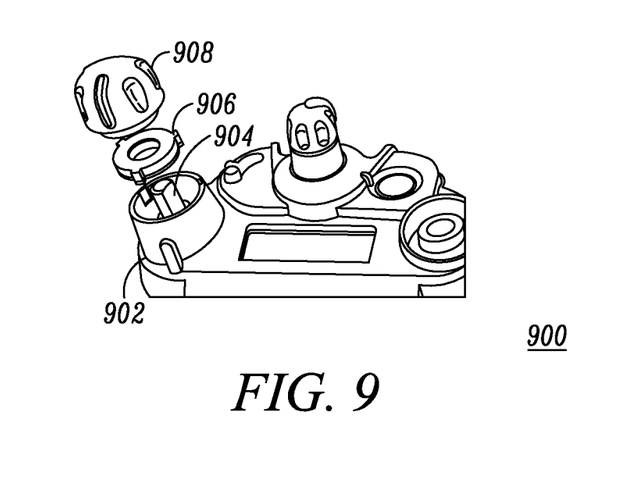
FIG. 9 is a radio incorporating a rotary control formed in accordance with various embodiments.

The rotary control provided by the various embodiments is well suited to the portable communication device environment, particularly where tight spatial constraints are involved. FIG. 9 shows a portable two-way radio 900. Radio 900 is a portable radio and as such the user interface contact area is very limited. The contact area is actually limited to peripheral contact. The various controls on the top surface of the portable radio 900 further limits the space a user can access, particularly a user wearing heavy gloves, such as those utilized in public safety environments.

Portable two-way radio 900 incorporates a rotary control module 906 formed in accordance with the various embodiments. Radio 900 comprises a housing 902 having a shaft 904 extending therefrom. The rotary control module 906 drops into and is retained within the housing about the shaft 904. A knob 908 is then coupled to the housing for turning of the rotary control module. In accordance with the various embodiments, the rotary control module comprises a casing, such as casing 502/504, 702/704 the casing comprising a rotating disk having upper and lower sliding surfaces. The sliding upper and lower surfaces may be in the form of rubber pads located on either side of the rotating disk or a silicone overmolded rotating disk. The casing further comprises a stationary disk, such as stationary disk 512 or 712, a metal spring, such as metal spring 514 or 714. In accordance with the various embodiments, the shaft, the rotating disk having upper and lower sliding surfaces, the stationary disk and metal spring are operationally engaged within the casing to provide a running-torque user interface. In accordance with the various embodiments, the spring 514 or 714 generates compression forces independent from the knob 908 and thus knob retention is improved. In operation, the knob 908 turns the shaft 904, and the shaft 904 turns rotary control module 906, the rotary control module 906 providing running-torque to the shaft and thus providing improved tactile feedback to the user rotating the knob 908.

All of the embodiments have provided for a running-torque assembly which utilizes a slideable surface element stacked on the top and bottom surfaces of the rotating disk. As previously described, the slideable surface element may comprise a first rubber pad stacked to the top surface of the rotating disk to form a first sliding surface and a second rubber pad stacked to the bottom surface of the rotating disk to form a second sliding surface. Additional pads and rotating disks may be added to increase the running-torque. Alternatively, the sliding surface element may comprise a coating, of for example silicone or rubber, overmolded to the rotating disk. When used in conjunction with the spring and stationary disk in the manner previously described, the running-torque stack up assembly can be adapted for individual switch modules, or drop-in modules independent of the switch and shaft. The combination of metallic and rubber surfaces stacked upon each other, having relative motion between metal and rubber in the presence of the precise normal force generated by the spring, results in resistance to motion of the rotating shaft thereby providing improved running-torque.

While FIG. 9 shows the shaft 904 coupled to the communication device, and the casing as a modular drop-in element 906, it is understood that the shaft may be part of the rotary control itself as was shown in the embodiments of FIGS. 1-4. Additional rotating disks with compressible surfaces can be stacked to provide further height if desired. The improved running-torque provided by the rotary control improves the user interface by minimizing inadvertent actuations. The spring of the modular approach allows the spring forces to be independent from the control knob. Unlike prior control in which spring forces are applied to the control knob causing problems with knob retention, the spring of the modular approach allow the spring forces to be independent from the control knob.

While knob 908 is shown as an angled control knob, a straight control knob may also be used. The angled control knob is advantageous in public safety applications in that the knob can be easily located under visually constrained conditions as well as providing an increased clearance area to accommodate a gloved user during handheld operation.

Accordingly, there has been provided an improved rotary control. The rotary control having the running-torque stack up assembly formed and operating in accordance with the various embodiments is particularly beneficial in public safety applications where, for example, gloved users may be working under adverse environmental conditions. Inadvertent actuation of the control is minimized and the tactile feedback of the user interface is improved.

The rotary control described by the various embodiments may be implemented in a variety of applications, such as volume control and light dimming, or other suitable applications requiring frictional resistance. While particularly advantageous for portable public safety type devices, the rotary control may also be applied to mobile and vehicular type electronic devices, as well as stationary devices. The control may be utilized in applications operating under DC or AC power.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A rotary control, comprising:
   a casing;
   a shaft;
   a running-torque stack up assembly located within the casing about the shaft, the running-torque stack up assembly comprising:
      a spring;
      a stationary disk stacked over the spring and rotationally constrained by the casing;
      a rotating disk stacked over the stationary disk and having a top surface and a bottom surface; and
      a slideable surface element including a first rubber pad and a second rubber pad stacked on the respective top and bottom surfaces of the rotating disk, the first rubber pad stacked to the top surface of the rotating disk forms a first sliding surface and the second rubber pad stacked to the bottom surface of the rotating disk forms a second sliding surface, the rotating disk with the slideable surface element being stacked over the stationary disk within the casing.

2. The rotary control of claim 1, wherein the
first rubber pad and second rubber pad form portions of a silicone or rubber coating overmolded to the rotating disk.

3. The rotary control of claim 1, wherein the stationary disk comprises tabs for rotationally constraining the stationary disk by the casing.

4. The rotary control of claim 1, wherein the rotating disk comprises a Double-D shaped hole to couple the rotating disk to the shaft, the rotating disk rotates in response to rotation of the shaft while the rubber pads slide freely.

5. The rotary control of claim 1, further comprising:
   an additional rotating disk stacked over the rotating disk and an additional slidable surface element comprising rubber pads respectively stacked on a top and a bottom surface of the additional rotating disk to increase running-torque resistance.

6. The rotary control of claim 1, wherein the spring comprises a metallic spring that generates a continuous perpendicular force to the stack up assembly in a direction of stacking of the stack-up assembly, the slideable surface element comprises a rubber surface, the stationary disk and rotating disk comprise metallic surfaces, and the metallic and rubber surfaces being stacked upon each other to provide relative motion between the metallic and rubber surfaces in conjunction with the perpendicular force generated by the spring resulting in resistance to motion in response to rotation of the shaft.

7. The rotary control of claim 1, the stationary disk transfers an equal amount of force to the slidable surface element and rotating disk.

8. The rotary control of claim 1, wherein the spring applies a perpendicular force directly to the stationary disk, the perpendicular force being transferred through the stack up assembly in a direction of stacking of the stack-up assembly, the perpendicular force of the spring in conjunction with a coefficient of friction associated with each of the stationary disk, the rotating disk and the slideable surface element generating a resistance against rotation.

9. The rotary control of claim 1, wherein the spring provides a force generating and wear compensating member.

10. A casing having a through-hole for a shaft, the casing having a recess within which is stacked:
    a rotating disk having sliding surfaces formed thereon, the sliding surfaces formed of a first rubber pad and a second rubber pad respectively stacked against opposing sides of the rotating disk;
    a stationary disk seated under the rotating disk and coupled to the casing; and
    a spring seated under the stationary disk and between the casing and the stationary disk.

11. The casing of claim 10, wherein the first rubber pad and second rubber pad form portions of an overmolded silicone coating formed about the rotating disk.

12. The casing of claim 10, wherein the stacked plurality of rubber pads, stationary disk and spring provide running-torque for the shaft.

13. The casing of claim 10, further comprising the shaft coupled through the through-hole.

14. A communication device, comprising:
    a housing;
    a rotary control coupled to the housing;
    a knob coupled to the housing for controlling the rotary control, the rotary control comprising:
    a shaft rotating in response to rotation of the knob; and
    a casing, the casing comprising:
       a rotating disk having a slideable upper surface and lower surface;
       a stationary disk stacked below the rotating disk; and
       a metal spring stacked below the stationary disk;
    wherein the shaft, a first rubber pad, the rotating disk, a second rubber pad, the stationary disk and the metal spring are operationally engaged within the casing to provide a running-torque user interface; and
    wherein the first and second rubber pads are respectively located on opposing sides of the rotating disk.

15. The communication device of claim 14, wherein the spring generates compression forces independent from the knob.

16. The communication device of claim 14, wherein the shaft is coupled to the communication device, and the casing comprises a modular drop-in element.

17. The communication device of claim 14, wherein the first rubber pad and second rubber pad form portions of a silicone or rubber overmolded rotating disk.

18. The communication device of claim 14, wherein the communication device comprises a two-way radio.

19. The communication device of claim 18, wherein the two-way radio consists of a portable handheld two-way radio.

20. The communication device of claim 18, wherein the knob provides radio on/off and volume control.

* * * * *